United States Patent [19]

Pautrat

[11] 4,221,398
[45] Sep. 9, 1980

[54] HIGHWAY TRAILER OF SELECTIVELY VARIABLE WIDTH

[75] Inventor: Jean-Claude Pautrat, Champs sur Yonne, France

[73] Assignee: J. B. Nicolas France S.A., France

[21] Appl. No.: 926,248

[22] Filed: Jul. 20, 1978

[30] Foreign Application Priority Data

Aug. 2, 1977 [FR] France .............................. 77 23809

[51] Int. Cl.² .......................................... B62D 13/04
[52] U.S. Cl. ................................ 280/444; 280/81 B; 280/656
[58] Field of Search ............... 280/426, 442, 443, 444, 280/81 B, 410, 408, 404, 103, 638, 656, DIG. 8, 81 R, 81 A, 81 B; 180/140, 21, 22, 23, 24, 24.01, 24.02

[56] References Cited

U.S. PATENT DOCUMENTS

| 3,339,942 | 9/1967 | Ratkovich | 280/656 |
| 3,520,549 | 7/1970 | De Lay | 280/81 R |
| 4,044,854 | 8/1977 | Schmitt | 180/140 |

FOREIGN PATENT DOCUMENTS

| 1036656 | 8/1958 | Fed. Rep. of Germany | 280/444 |
| 1917582 | 10/1970 | Fed. Rep. of Germany | 280/81 B |

*Primary Examiner*—John J. Love
*Assistant Examiner*—Randall A. Schrecengost
*Attorney, Agent, or Firm*—Larson, Taylor and Hinds

[57] ABSTRACT

A highway trailer of selectively variable width has two side structures each having at least one longitudinal row of axles provided with ground contacting wheels. Hydraulic jacks are provided for moving the side structures between an inner position corresponding to minimum width and an outer position corresponding to maximum width of the trailer. A hitching pole is rotatably connected to a cross-beam slidably connecting the side structures and controls fluid steering cylinders located symmetrically each between the steering cross-beam and the hitching pole. One pair of auxiliary fluid jacks are connected each to a corresponding one of the steering jacks. Each auxiliary jack angularly moves a corresponding axle.

9 Claims, 7 Drawing Figures

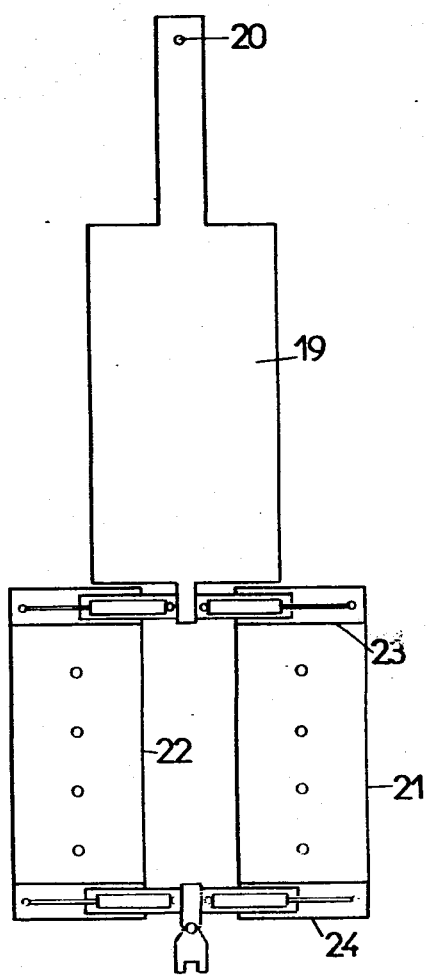
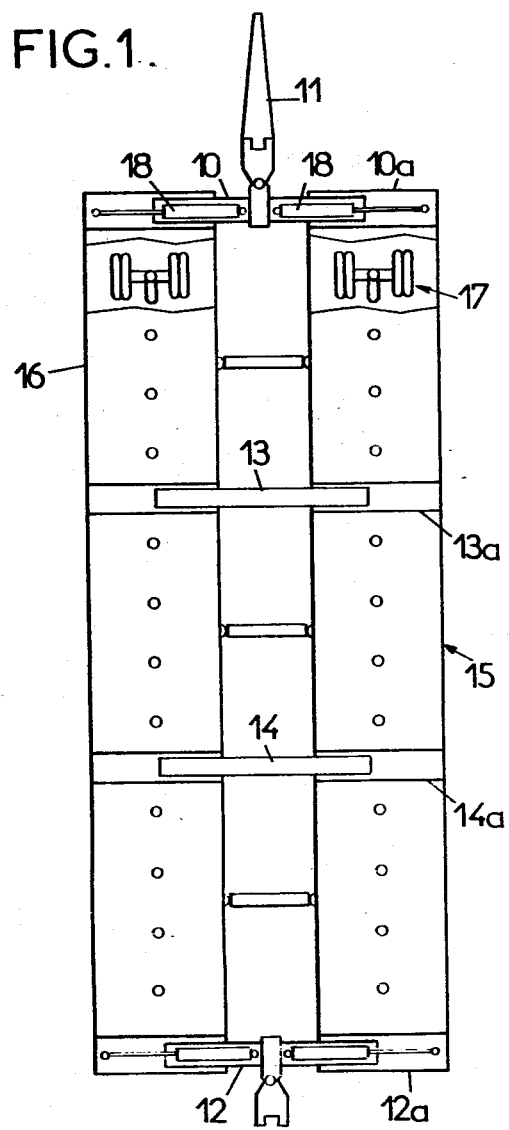

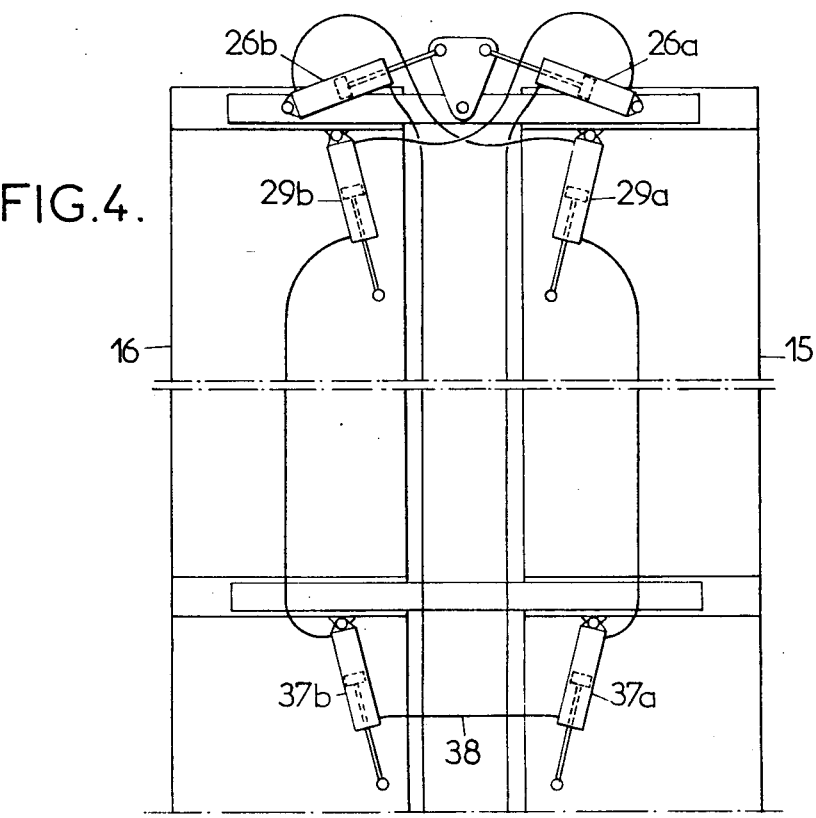
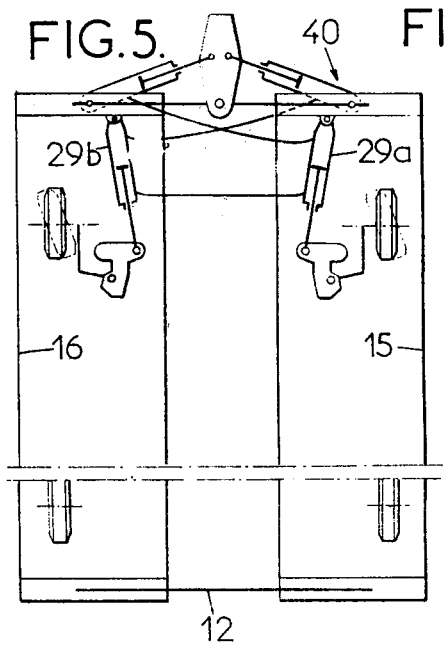
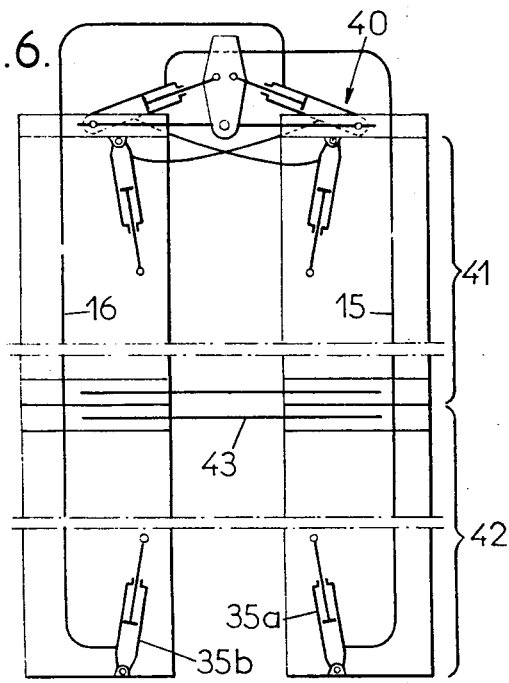

HIGHWAY TRAILER OF SELECTIVELY VARIABLE WIDTH

BACKGROUND AND SUMMARY OF THE INVENTION

The invention relates to highway trailers and more particularly to trailer vehicles of selectively variable width.

It is often desirable to modify the platform width of a transport vehicle, particularly for transporting exceptional loads of large transverse dimensions, such as public works machines.

In many States, the regulations for exceptional transport limit the admissible load per axle or per axle line as a function of the transverse track of the vehicle. Providing that the track is widened at the same time as the platform, the most appropriate wheel track can be adopted for the transport of a given load. Moreover, once the transport has been completed, the vehicle can then be modified to a smaller track and possibly comply with the provisions of the law whereby the return journey may be achieved under normal conditions and at a higher speed, whereas the outward journey with an outsize vehicle must be undertaken under much more restrictive conditions, with forerunning and trailing vehicles.

Gooseneck trailers have been proposed in which a side frame and ground contacting wheels carried by that frame are transversely movable with respect to a main frame. But these vehicles have considerable defects which make their commercial interest doubtful. Moving the side frame aside causes the appearance of a gap near one side of the platform, i.e. in a region where are placed the supports of the most frequent loads (caterpillar tracks or wheels of public works equipment particularly).

Moreover, this solution cannot be used on vehicles fitted with steerable wheels (which is the case with high tonnage trailers) because of the steering diagram changes which it involves.

There is also known (French Pat. No. 1,303,042) a towed road vehicle whose drawbar drives a linkage for steering the first line of wheels and drives the movable members of two symmetric steering jacks associated with two corresponding jacks which steer the wheels of the last line of the trailer. Such steering system cannot be transposed to the case of a variable width trailer since for each track width the steering diagram would have to be modified.

It is an object of the invention to provide a highway trailer, of adjustable width over part at least of its length, provided with steerable wheels which overcomes the above disadvantages.

According to the invention, a highway trailer of selectively variable width has two side structures, each having at least one longitudinal row of axles provided with ground contacting wheels; transverse means connecting said side structures, enabling movement of said side structures in the direction transverse to the direction movement of the trailer and including a steering crossbeam; motor means for moving the side structures between an inner position corresponding to minimum width and track of the trailer and an outer position corresponding to maximum width and track; a hitching member rotatably connected to said transverse means and adapted to be connected to a driving vehicle; and steering means for some at least of said axles, comprising a pair of fluid steering jacks located symmetrically each between said steering cross-beam and said hitching member, whereby the fluid compartments of said jacks are subjected to variations in volume responsive to rotation of the steering member; and at least one pair of auxiliary fluid jacks each connected by pipe means to a corresponding one of said steering jacks and each located between one of said side structure and a steering arm of a corresponding one of said axles.

The invention will be better understood from a consideration of the following description of particular embodiments thereof given by way of non-limiting examples. The description refers to the accompanying drawings.

SHORT DESCRIPTION OF THE DRAWINGS

FIG. 1 is a very schematical plan view of a trailer incorporating an embodiment of the invention;

FIG. 2, similar to FIG. 1, shows a semitrailer or gooseneck trailer according to another embodiment;

FIG. 4 is a partial schematical view showing a trailer variable in width and comprising several modules fixed to each other;

FIGS. 5, 6 and 7 are plan views of possible variations in design.

DESCRIPTION OF PREFERRED EMBODIMENTS

Figure 3:
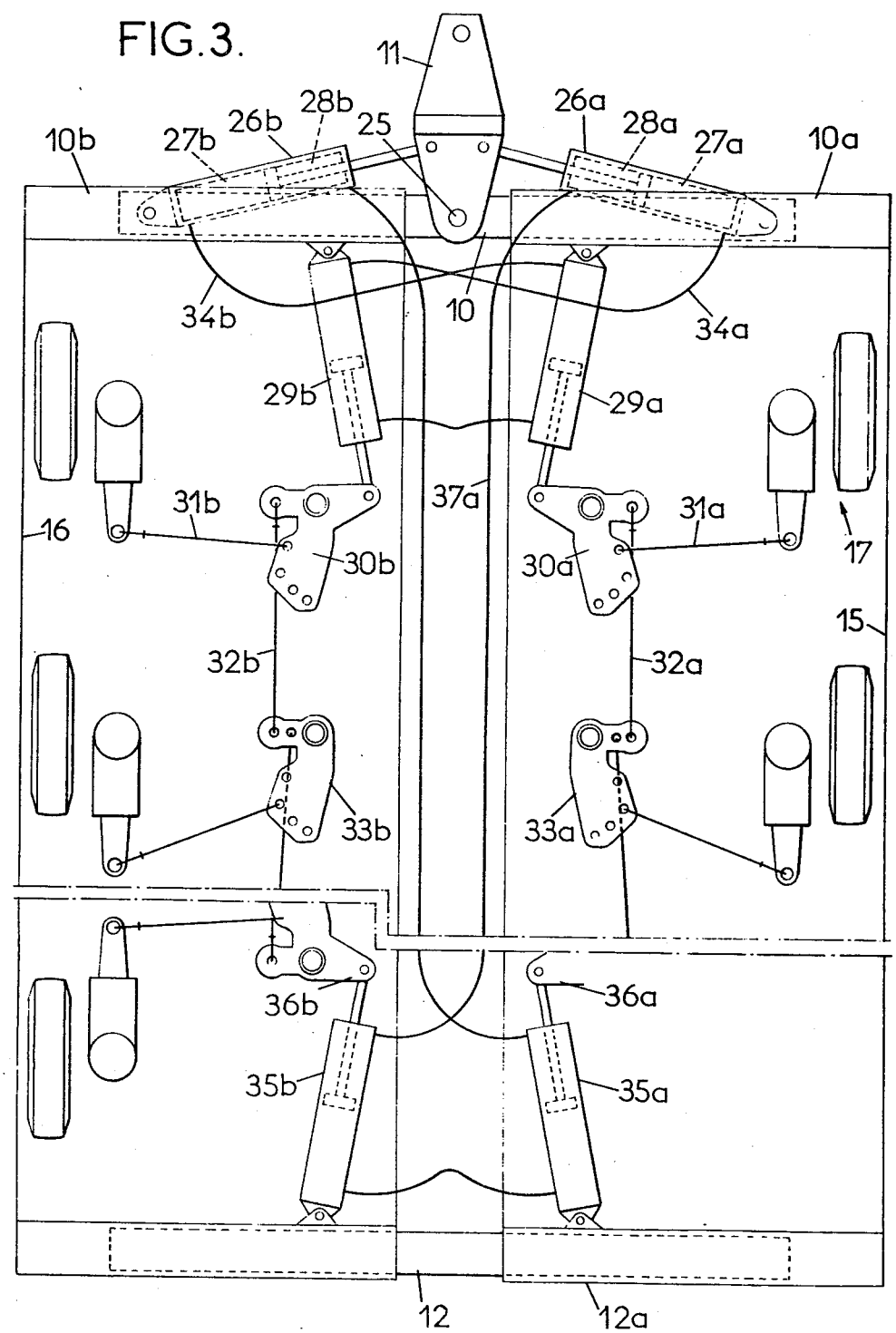
FIG. 3 is a schematical plan view showing steering means usable on the trailer of FIG. 1.

Referring to FIG. 1, there is shown a trailer which may be regarded as comprising two side structures maintained in place in relation to each other by a frame which only comprises a front cross-piece 10 provided with a steering pole 11, a rear cross-piece 12 and two intermediate cross-pieces 13 and 14.

The two side structures 15 and 16 are similar in construction and only structure 15 will be described. It comprises a chassis equipped with a row of aligned axles. The front axle 17 only is shown. It will be assumed in the following that the front and rear axles of structure 15 are provided with auxiliary jacks for turning them practically symmetrically and are connected to the intermediate axles of the same row by mechanical reduction linkages which decrease the turning angles of the axles by an amount which is higher for the axles closer to the midlength of the trailer. In the embodiment of FIG. 1, where each row comprises twelve axles, this decrease is necessary. The two central axles alone may have a fixed orientation. When the number of axles per row is small this is not so; in the case of three axles, it will in general be sufficient for the front axle to be steered by the pole and to drive, with a suitable reduction ratio; the second axle (the third being fixed in orientation). In the case of four axles, the front and rear axles will in general alone be steerable.

Side structure 15 comprises cross-pieces 10a, 12a, 13a and 14a arranged for slidable movement on central cross-beams 10, 12, 13 and 14 respectively. The means for moving the side parts apart comprise fluid pressure jacks 18 fed by a hydraulic power unit, through flow dividers which ensure sufficient balance. Locking means are provided on the jacks or the cross-pieces for locking the side structures once the desired track has been obtained.

Referring to FIG. 2, a similar arrangement may be used, for a semi-trailer or gooseneck trailer. Then there is provided a front part 19 fitted with a gooseneck adapted to be carried by the fifth wheel 20 of the tractor. Side structures 21 and 22 then extend over only a fraction of the length of the semi-trailer. Often, it will be sufficient to provide, on each side structure 21, 22, a front sliding cross-beam 23 and a rear sliding cross-beam 24. It will be appreciated that spacing-apart jacks 18 may be placed inside the cross-beams (as shown schematically in FIGS. 1 and 2).

There will now be described, with reference to FIG. 3, a steering system usable with the trailer of FIG. 1. For more simplicity and clarity, there is shown in FIG. 3 only the first two axle lines and a single wheel per axle and the scale has not been respected.

The system comprises the hitching pole 11, rotatable about a pin 25 placed in the centre of cross-beam 10. Two fluid operated double acting steering jacks 26a and 26b are symmetrically mounted, each between the steering pole 11 and one end of beam 10. The jacks each comprise a cylinder fixed to the cross-beam and a piston which is connected to the pole by a rod and separates two compartments (27a and 28a in cylinder 26a, 27b and 28b in cylinder 26b). It can be seen that moving structures 15 and 16 apart or toward each other does not modify the volume of the compartments.

Each of the side structures of the trailer is provided with an auxiliary steering jack 29a or 29b each mounted between a fixed point (e.g. on the corresponding cross-beam 10a or 10b) and a relay lever 30a or 30b. Each relay lever (typically consisting of several pieces secured together) drives a linkage 31a or 31b for swivelling an axle such as 17 and drives a longitudinal rod 32a or 32b which actuates the next relay lever 33a or 33b. The levers and the successive links are dimensioned so that the turning angle is the smaller the further the controlled axle is located from the end axle controlled by an auxiliary jack.

Steering jacks 26a and 26b are hydraulically coupled to auxiliary jacks 29a and 29b and drive them. In the illustrated embodiment, where the cylinders of jack 29a and 29b are connected to the corresponding relay levers 30a or 30b, the bottom compartment 27a or 27b of each steering jack (compartment opposed to the piston rod) is connected to the bottom compartment of the opposite auxiliary jack 29b or 29a by a line 34a or 34b, respectively.

Steering control for the rear axles of the trailer is achieved by jacks 35a and 35b and is symmetrical with that of the front axles. The cylinder of jack 35a, for example, is hinged to cross-beam 12a whereas the piston rod is hinged to the relay lever 36a of the rear axle. Auxiliary jacks 35a and 35b are again controlled by steering jacks 26a and 26b: the rod-side compartments of the steering jacks 26a and 26b are connected to the bottom-side compartments of jacks 35b and 35a, respectively, by lines 37a and 37b.

It can be seen that there is thus obtained a transmission of the movement such that the axes of the wheels converge satisfactorily in an instantaneous axis of rotation corresponding to the center of the turning circle imposed by the tractor, whatever the track width.

Trailers of different lengths and of different tonnages may be formed from a small number of standard modules and from added "boxes", each box comprising a central steering cross-beam, associated lateral cross-beams and motor means for moving the lateral beams apart; such a modular construction reduces considerably the costs. Some examples of modular constructions will now be given.

Each of the modules may comprise a structure carried by at least one row of axles, having from three to seven axles in general, and is provided at one end with a cross-beam and at the other end with an auxiliary steering jack driving the axle closest to the jack. The other axles connected to the axle are controlled by the jack via a reduction linkage. There will be two types of modules, of symmetrical constructions.

Referring to FIG. 5, there is shown a first embodiment in which each side structure 15 or 16 of the trailer is formed by a single module; the modules are coupled at the rear by a central cross-beam 12 which slidably projects into their cross-beams, and at the front by box 40. The bottom side compartments of auxiliary jacks 29a and 29b are connected to the steering jacks, as in FIG. 3. The rod side compartments are connected together.

If each row of the trailer has few axles only (two or three) it may be acceptable that the instantaneous centre of rotation of the trailer is located behind the transversal midplane of the trailer. On the other hand, if that number is high, the axles of the last line(s) should be steered and that may be done by having a mechanical steering linkage which "crosses" the longitudinal midplane.

In another embodiment, each side structure comprises several modules each having a small number of axles per row. Then, the end modules are in reversed positions and the functions to be achieved are those shown in FIG. 6. Since standard modules are to be used, the cross-beams will be arranged as shown schematically in FIG. 6 in the case of side structures each having two modules 41 and 42.

Cross-beam 43 connecting the first two modules will not be directly adjacent to the auxiliary jacks 35a and 35b of the modules; for this reason, the solution can only be used if the last modules are short.

If each side structure comprises more than two modules, the progressive reduction of the turning angles of the axles on the modules closest to the transversal mid plane of the trailer may be effected very simply. Referring to FIG. 4, the two front modules of the parts of a trailer, as well as the steering jacks 26a and 26b and front auxilliary jacks 29a and 29b, are again illustrated. But, while in the case of FIG. 1 the rod-side compartments of jacks 29a and 29b are connected together, in FIG. 4 the compartments are connected to the bottom-side compartments of jacks 37a and 37b of the following corresponding modules in the same row. An automatic reduction of the turning angle is obtained if the jacks are identical. This reduction may be continued over several successive modules. If jacks 37a and 37b are the jacks of the modules closest to the transversal midplane of the trailer, their rod-side compartments are connected by a line 38.

Figure 7:
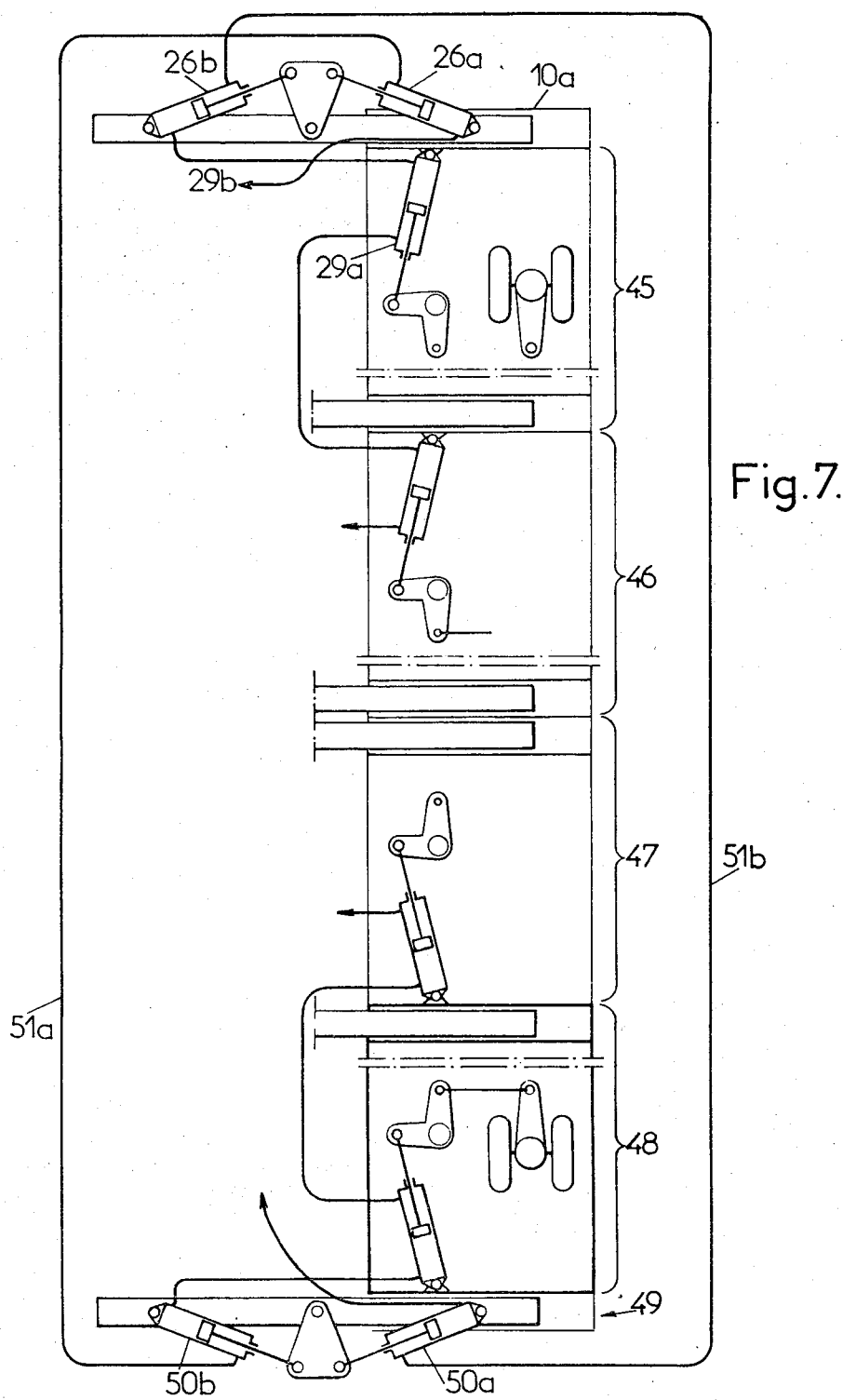

Each of the side structures of the trailer may be formed by a large number of modules, as shown schematically in FIG. 7. In FIG. 7, four modules 45, 46, 47 48 forming the right-hand side structure of a trailer are shown. The length and the tonnage of the trailer may then impose the help of a "pusher" tractor: then a box 49 comprising a pole and two steering jacks 50a and 50b is added at the row of the trailer, whereby a symmetrical construction is obtained. The hydraulic connections are also symmetrical; for the front half and the rear half of the trailer they are similar to those shown in FIG. 4. Moreover, the rod-side compartments of steering jacks 26a and 26b are respectively connected to the rod-side compartments of jacks 50a and 50b by lines 51a and 51b.

The arrangements shown schematically in FIGS. 3 to 7 may be implemented in numerous ways. Moreover, they are directly transposable to the case of a semitrailer or gooseneck trailer.

I claim:

1. A highway trailer of selectively variable width, having: two side structures each having at least one longitudinal row of axles provided with ground contacting wheels; transverse means connecting said side structures, enabling movement of said side structures in the direction transverse to the direction of movement of the trailer and including a steering cross-beam; motor means for moving the side structures between an inner position corresponding to minimum width and track of the trailer and an outer position corresponding to maximum width and track; a hitching member rotatably connected to said transverse means and adapted to be connected to a driving vehicle; and steering means for some at least of said axles, comprising a pair of fluid steering jacks located symmetrically each between said steering cross-beam and said hitching member, whereby the fluid compartments of said jacks are subjected to variations in volume responsive to rotation of the hitching member, and at least one pair of auxiliary fluid jacks each connected by pipe means to a corresponding one of said steering jacks and each located between one of said side structures and a steering arm of a corresponding one of said axles.

2. A trailer according to claim 1, wherein each auxiliary jack drives the first axle of a row and said first axle is connected to following axles of the same row by a mechanical steering linkage.

3. A trailer according to claim 2, wherein each said auxiliary jack or front steering jack is connected to a corresponding rear jack, driving the steering arm of the last axle of the row which is also provided with a mechanical transmission linkage to preceding axles.

4. A trailer according to claim 1, wherein the side structures each consists of a row of substantially identical modules, each module comprising a row of axles and two adjacent modules of different side structures being connected by a tranverse cross-piece.

5. A trailer according to claim 1, wherein each side structure is formed by several identical modules rigidly fixed one behind the other, each provided with a row of axles, each of said steering jacks being connected to a corresponding auxiliary jack located on the first module and connected to the auxiliary jack of the following module by fluid pipe means.

6. A trailer according to claim 1, wherein the means for moving the side structures transversely are jacks fed simultaneously through flow dividers and provided with locking means.

7. A trailer according to claim 5, wherein the rod side compartment of each auxiliary jack placed at the front end of the first module is connected to the bottom side compartment of the corresponding auxiliary jack placed at the front end of the following module.

8. A trailer according to claim 1, wherein said side structures each comprises two rows of identical modules located side by side and wherein said transverse means and motor means are combined into a front unit connecting the front modules of the two rows and the rear modules of the two rows, each said unit being further provided with means for guiding said side structures with respect to each other while said steering jacks are connected to said front unit.

9. A highway gooseneck trailer of selectively variable width, comprising:
a front part of fixed width provided with a hitching plate adapted to be connected to a driving vehicle;
a rear part including two side structures each having at least one longitudinal row of axles provided with ground contacting wheels; transverse means of connecting said side structures, enabling movement of said side structures in the direction transverse to the direction of movement of the trailer and motor means for moving the side structures between an inner position corresponding to minimum width and track of the trailer and an outer position corresponding to maximum width and track; and
steering means for some at least of said axles, comprising a pair of fluid steering jacks located symmetrically with respect to the hitching plate and so arranged that the fluid compartments of said jacks are subjected to variations in volume responsive to rotation of the hitching plate, and at least one pair of auxiliary fluid jacks each connected by pipe means to a corresponding one of said steering jacks and each located between one of said side structures and a steering arm of a corresponding one of said axles.

* * * * *